(12) United States Patent
Yokokawa et al.

(10) Patent No.: US 8,750,635 B2
(45) Date of Patent: Jun. 10, 2014

(54) IMAGE PROCESSING APPARATUS, IMAGE PROCESSING METHOD, PROGRAM, AND RECORDING MEDIUM

(75) Inventors: Masatoshi Yokokawa, Kanagawa (JP); Takefumi Nagumo, Kanagawa (JP); Jun Luo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/614,502

(22) Filed: Sep. 13, 2012

(65) Prior Publication Data

US 2013/0084024 A1    Apr. 4, 2013

(30) Foreign Application Priority Data

Sep. 29, 2011   (JP) .................................. 2011-213867

(51) Int. Cl.
*G06K 9/36* (2006.01)

(52) U.S. Cl.
USPC ........................................................ 382/236

(58) Field of Classification Search
USPC .............................. 382/107, 236; 375/240.16
See application file for complete search history.

(56) References Cited

U.S. PATENT DOCUMENTS

| 5,473,379 A * | 12/1995 | Horne ...................... 375/240.16 |
| 5,657,087 A * | 8/1997 | Jeong et al. .............. 375/240.16 |
| 6,148,108 A * | 11/2000 | Nishikawa ..................... 382/236 |
| 6,925,123 B2 * | 8/2005 | Subramaniyan et al. 375/240.16 |

FOREIGN PATENT DOCUMENTS

| JP | 2010-147985 | 7/2010 |
| JP | 2012-015631 | 1/2012 |

* cited by examiner

*Primary Examiner* — Phuoc Tran
(74) *Attorney, Agent, or Firm* — Finnegan, Henderson, Farabow, Garrett & Dunner, LLP

(57) ABSTRACT

There is provided an image processing apparatus including a local-motion-compensation-processing unit which generates a local-motion-compensation image by detecting a local motion vector, which is a motion vector for each block forming an image, from a standard image and a reference image, and performing motion compensation on the reference image using the local motion vector, a global-motion-compensation-processing unit which generates a global-motion-compensation image by calculating a global motion vector, which is a motion vector for an entire image between the standard image and the reference image, using the local motion vector, and performing motion compensation on the reference image using the global motion vector, and a blend processing unit which generates a blend-motion-compensation image by combining a pixel value of a pixel in the local-motion-compensation image and a pixel value of a pixel in the global-motion-compensation image based on a noise intensity for a luminance value of an image.

20 Claims, 12 Drawing Sheets

IMAGE PROCESSING APPARATUS, IMAGE PROCESSING METHOD, PROGRAM, AND RECORDING MEDIUM

BACKGROUND

The present technology relates to an image processing apparatus, an image processing method, a program, and a recording medium, and in particular, to an image processing apparatus, an image processing method, a program, and a recording medium capable of generating a high quality noise-reduced image even under changing illuminance.

In the past, as a method for reducing noise in images captured with an imaging apparatus, it has been proposed to generate a noise-reduced image using a blend motion compensation image (BMC image) generated by combining a local motion compensation image (LMC image) generated using a local motion vector for each block and a global motion compensation image (GMC image) generated using a global motion vector of the whole image based on the reliability of the LMC image and the GMC image (e.g., refer to JP 2010-147985A).

SUMMARY

However, the above-described method does not consider changes in noise intensity when the illuminance in the imaging environment changes. In such a case, the LMC image and the GMC image cannot be correctly combined, which can prevent a proper BMC image from being obtained. Consequently, the quality of the noise-reduced image can deteriorate.

The present technology, which was arrived at in view of such circumstances, enables the generation of a high quality noise-reduced image even under changing illuminance.

According to an embodiment of the present technology, there is provided an image processing apparatus, including a local motion compensation processing unit configured to generate a local motion compensation image by detecting a local motion vector, which is a motion vector for each block forming an image, from a standard image and a reference image, and performing motion compensation on the reference image using the local motion vector, a global motion compensation processing unit configured to generate a global motion compensation image by calculating a global motion vector, which is a motion vector for an entire image between the standard image and the reference image, using the local motion vector, and performing motion compensation on the reference image using the global motion vector, and a blend processing unit configured to generate a blend motion compensation image by combining a pixel value of a pixel in the local motion compensation image and a pixel value of a pixel in the global motion compensation image based on a noise intensity for a luminance value of an image.

The blend processing unit may include a threshold processing unit configured to determine whether a difference absolute value between a pixel value of a pixel in the standard image and a pixel value of a pixel in the local motion compensation image is greater than a threshold set based on the noise intensity, and a blend motion compensation image generation unit configured to generate the blend motion compensation image by setting a pixel value of a pixel in the blend motion compensation image to a pixel value of a pixel in the local motion compensation image or the global motion compensation image based on whether the difference absolute value is greater than the threshold or not.

The blend motion compensation image generation unit may be configured to, when it is determined that the difference absolute value is greater than the threshold, set the pixel value of a pixel in the blend motion compensation image to the pixel value of a pixel in the local motion compensation image, and when it is determined that the difference absolute value is not greater than the threshold, set the pixel value of a pixel in the blend motion compensation image to the pixel value of a pixel in the global motion compensation image.

The blend processing unit may include a blend ratio determination unit configured to determine a blend ratio to be used in combining a pixel value of a pixel in the local motion compensation image and a pixel value of a pixel in the global motion compensation image based on the noise intensity, and a blend motion compensation image generation unit configured to generate the blend motion compensation image by combining a pixel value of a pixel in the local motion compensation image and a pixel value of a pixel in the global motion compensation image based on the blend ratio.

According to an embodiment of the present technology, there is provided an image processing method performed by an image processing apparatus, the image processing apparatus including a local motion compensation processing unit configured to generate a local motion compensation image by detecting a local motion vector, which is a motion vector for each block forming an image, from a standard image and a reference image, and performing motion compensation on the reference image using the local motion vector, a global motion compensation processing unit configured to generate a global motion compensation image by calculating a global motion vector, which is a motion vector for an entire image between the standard image and the reference image, using the local motion vector, and performing motion compensation on the reference image using the global motion vector, and a blend processing unit configured to generate a blend motion compensation image by combining a pixel value of a pixel in the local motion compensation image and a pixel value of a pixel in the global motion compensation image based on a noise intensity for a luminance value of an image, the image processing method including generating a local motion compensation image by detecting a local motion vector, which is a motion vector for each block forming an image, from a standard image and a reference image, and performing motion compensation on the reference image using the local motion vector, generating a global motion compensation image by calculating a global motion vector, which is a motion vector for an entire image between the standard image and the reference image, using the local motion vector, and performing motion compensation on the reference image using the global motion vector, and generating a blend motion compensation image by combining a pixel value of a pixel in the local motion compensation image and a pixel value of a pixel in the global motion compensation image based on a noise intensity for a luminance value of an image.

According to an embodiment of the present technology, there is provided a program which causes a computer to execute local motion compensation processing for generating a local motion compensation image by detecting a local motion vector, which is a motion vector for each block forming an image, from a standard image and a reference image, and performing motion compensation on the reference image using the local motion vector, global motion compensation processing for generating a global motion compensation image by calculating a global motion vector, which is a motion vector for an entire image between the standard image and the reference image, using the local motion vector, and performing motion compensation on the reference image using the global motion vector, and blend processing for generating a blend motion compensation image by combining a pixel value of a pixel in the local motion compensation image and a pixel value of a pixel in the global motion compensation image based on a noise intensity for a luminance value of an image.

According to an embodiment of the present technology, there is provided an image processing apparatus which generates a local motion compensation image by detecting a local motion vector, which is a motion vector for each block forming an image, from a standard image and a reference image, and performing motion compensation on the reference image using the local motion vector, generates a global motion compensation image by calculating a global motion vector, which is a motion vector for an entire image between the standard image and the reference image, using the local motion vector, and performing motion compensation on the reference image using the global motion vector, and generates a blend motion compensation image by combining a pixel value of a pixel in the local motion compensation image and a pixel value of a pixel in the global motion compensation image based on a noise intensity for a luminance value of an image.

According to an embodiment of the present technology, it is possible to generate a high quality noise-reduced image even under changing illuminance.

DETAILED DESCRIPTION OF THE EMBODIMENT(S)

Figure 1:
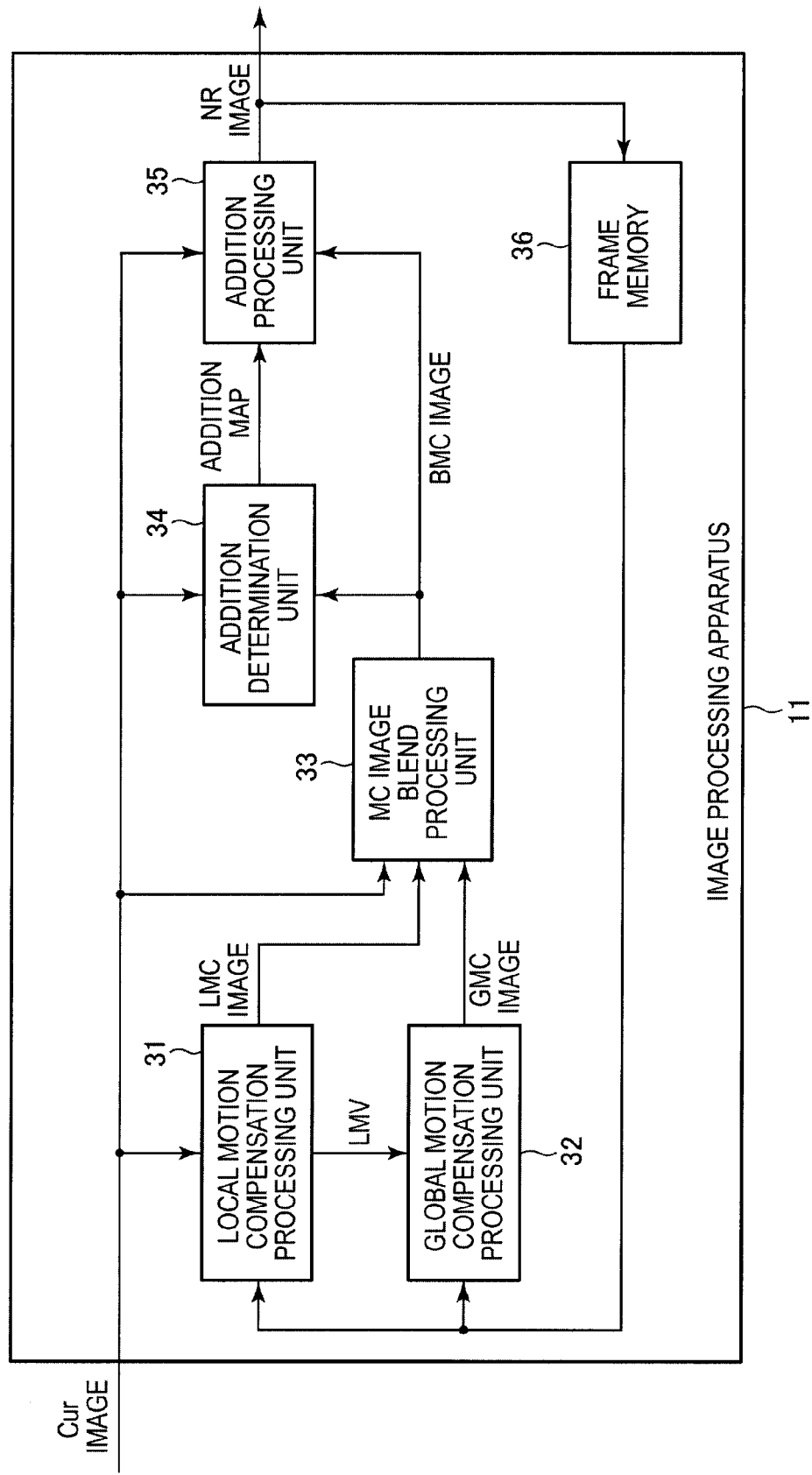
FIG. 1 is a block diagram illustrating a function configuration example according to an embodiment of an image processing apparatus in which the present technology is applied.

Preferred embodiments of the present technology will now be described with reference to the appended drawings. This description will be carried out in the following order.

1. Image processing apparatus configuration
2. First configuration example of an MC image blend processing unit
3. Regarding noise reduction processing and blend processing
4. Second configuration example of an MC image blend processing unit and blend processing
5. Third configuration example of an MC image blend processing unit and blend processing
6. Fourth configuration example of an MC image blend processing unit and blend processing <1. Image Processing Apparatus Configuration>

FIG. 1 illustrates a configuration according to an embodiment of an image processing apparatus in which the present technology is applied.

The image processing apparatus 11 in FIG. 1 performs, for example, noise reduction processing on a standard image (hereinafter, "Cur image") supplied (input) from a (not illustrated) imaging apparatus to reduce noise included in the Cur image, and supplies the resultant noise-reduced image (hereinafter, "NR image") to a (not illustrated) storage device, display device and the like. The images input into the image processing apparatus 11 are moving images formed from a plurality of temporally continuous frames. Further, the image processing apparatus 11 itself may also be provided with an imaging apparatus such as a digital camera.

The image processing apparatus 11 illustrated in FIG. 1 is configured from a local motion compensation processing unit 31, a global motion compensation processing unit 32, an MC image blend processing unit 33, an addition determination unit 34, an addition processing unit 35, and a frame memory 36.

The local motion compensation processing unit 31 detects from a Cur image as a frame of interest and an NR image of one frame before from the frame memory 36 as a reference image to be referenced during noise reduction processing, a local motion vector LMV, which is a motion vector for each block forming these images, and supplies the detected local motion vector LMV to the global motion compensation processing unit 32. Specifically, the local motion compensation processing unit 31 determines a local motion vector LMV for each block by aligning Cur image blocks with the corresponding NR image blocks.

Further, the local motion compensation processing unit 31 generates a local motion compensation image (hereinafter, "LMC image") in which the NR image is aligned with the Cur image in block units by performing motion compensation of the NR image using the detected local motion vector LMV for each block, and supplies the generated LMC image to the MC image blend processing unit 33.

The global motion compensation processing unit 32 generates a global motion compensation image (hereinafter, "GMC image") in which the NR image is aligned with the Cur image over a whole image by performing motion compensation of the NR image using local motion vectors LMV from the local motion compensation processing unit 31, and supplies the generated GMC image to the MC image blend processing unit 33. Specifically, the global motion compensation processing unit 32 generates a GMC image by detecting a global motion vector GMV, which is a motion vector for an entire image between the Cur image and the NR image, using local motion vectors LMV from the local motion compensation processing unit 31, and then performing motion compensation of the NR image using that global motion vector GMV.

Although the LMC image generated by the local motion compensation processing unit 31 is correctly aligned even when there is localized motion, its alignment accuracy for the whole image is low. On the other hand, although the GMC image has a high alignment accuracy for the whole image, it does not take into account localized motion.

Accordingly, the MC image blend processing unit 33 generates a blend motion compensation image (hereinafter, "BMC image") formed by combining two motion compensation image (MC images), namely, the LMC image from the local motion compensation processing unit 31 and the GMC image from the global motion compensation processing unit 32, in which portions where there is localized motion are formed from the LMC image and portions where there is no localized motion are formed from the GMC image, and supplies the generated BMC image to the addition determination unit 34 and the addition processing unit 35. Specifically, the MC image blend processing unit 33 generates the BMC image by combining the LMC image and the GMC image based on the intensity of noise caused by the image sensor.

The addition determination unit 34 calculates for each pixel an addition weighting to be used by the addition processing unit 35 based on the Cur image and the BMC image from the MC image blend processing unit 33. Specifically, the addition determination unit 34 generates an addition map in which a BMC image addition weighting is set from a value from 0 to 1 for each pixel.

The addition processing unit 35 generates an NR image by adding the Cur image and the BMC image while giving a weighting to each pixel using the addition map from the addition determination unit 34. Specifically, based on the addition map from the addition determination unit 34, the addition processing unit 35 generates the NR image by adding a weighted average between the Cur image and the BMC image to each pixel, outputs the generated NR image to a (not illustrated) storage device, display device and the like, and holds (stores) the NR image in the frame memory 36.

The frame memory 36 delays the NR image from the addition processing unit 35 by one frame, and supplies this NR image as the previous frame of an NR image that has undergone noise reduction processing to the local motion compensation processing unit 31 and the global motion compensation processing unit 32.

<2. First Configuration Example of an MC Image Blend Processing Unit>

Next, a first configuration example of the MC image blend processing unit 33 will be described with reference to FIG. 2.

Figure 2:
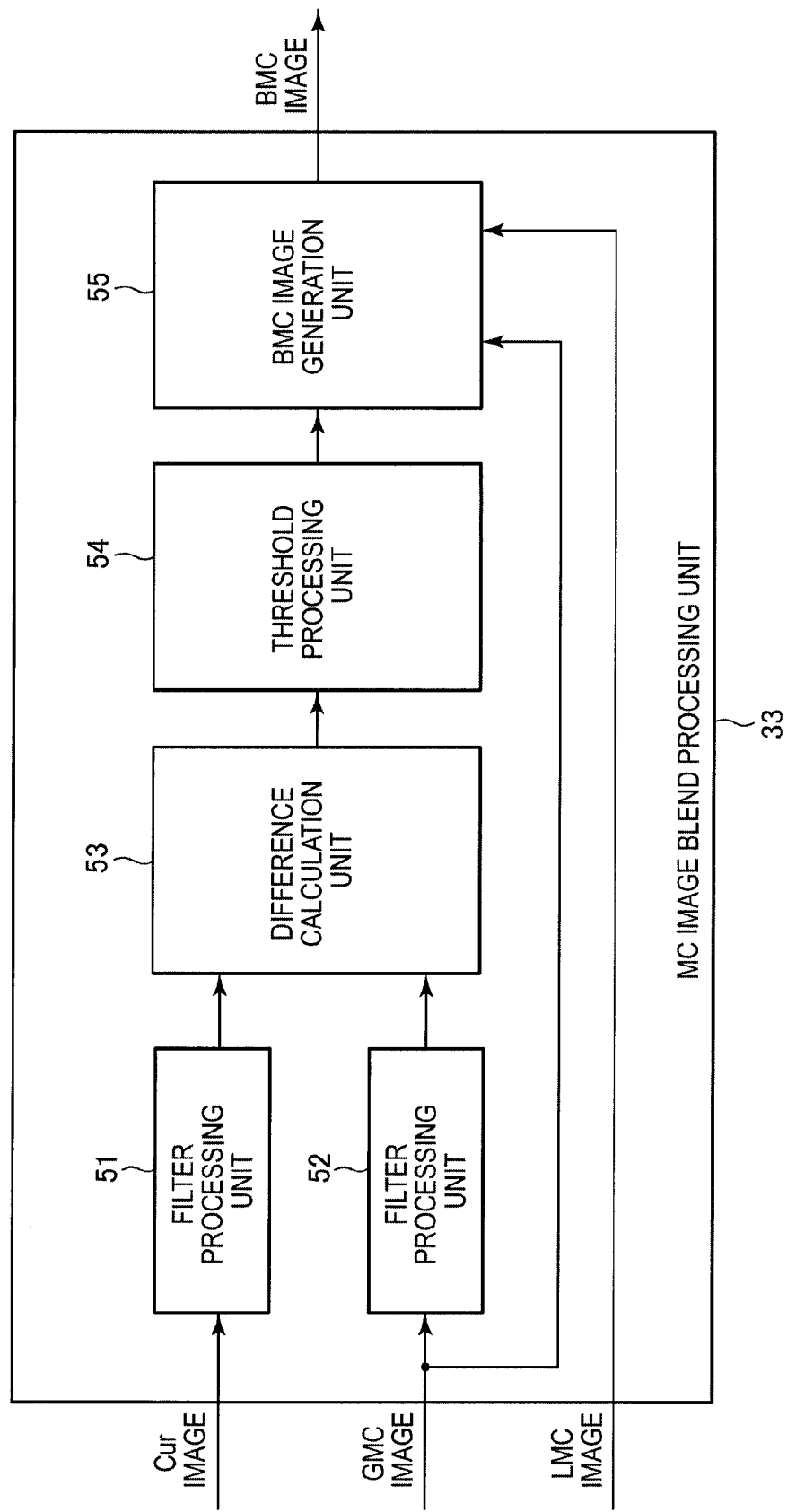
FIG. 2 is a block diagram illustrating a first configuration example of an MC image blend processing unit.

The MC image blend processing unit 33 illustrated in FIG. 2 is configured from a filter processing unit 51, a filter processing unit 52, a difference calculation unit 53, a threshold processing unit 54, and a BMC image generation unit 55.

The filter processing unit 51 performs filter processing on the Cur image, and supplies the processed Cur image to the difference calculation unit 53. Specifically, the filter processing unit 51 performs filter processing on the Cur image using a filter such as a median filter, a low-pass filter, or a combination of a median filter and a low-pass filter.

The filter processing unit 52 performs filter processing on the GMC image, and supplies the processed GMC image to the difference calculation unit 53. Specifically, the filter processing unit 52 performs filter processing on the GMC image using a filter such as a median filter, a low-pass filter, or a combination of a median filter and a low-pass filter.

The difference calculation unit 53 calculates for each pixel a difference in the pixel values for the Cur image subjected to filter processing by the filter processing unit 51 and the GMC image subjected to filter processing by the filter processing unit 52, and supplies the absolute value of the obtained difference (difference absolute value) to the threshold processing unit 54. In the following, the difference absolute value between the Cur image pixel value and the GMC image pixel value may also be referred to simply as "difference value".

The threshold processing unit 54 determines whether the difference value for each pixel from the difference calculation unit 53 is greater than a threshold set based on the noise intensity for a luminance value, and supplies the determination result to the BMC image generation unit 55.

The BMC image generation unit 55 generates a BMC image by selecting either the GMC image or the LMC image for each pixel based on the determination result from the threshold processing unit 54, and supplies the generated BMC image to the addition determination unit 34 and the addition processing unit 35.

<3. Regarding Noise Reduction Processing and Blend Processing>

Figure 3:
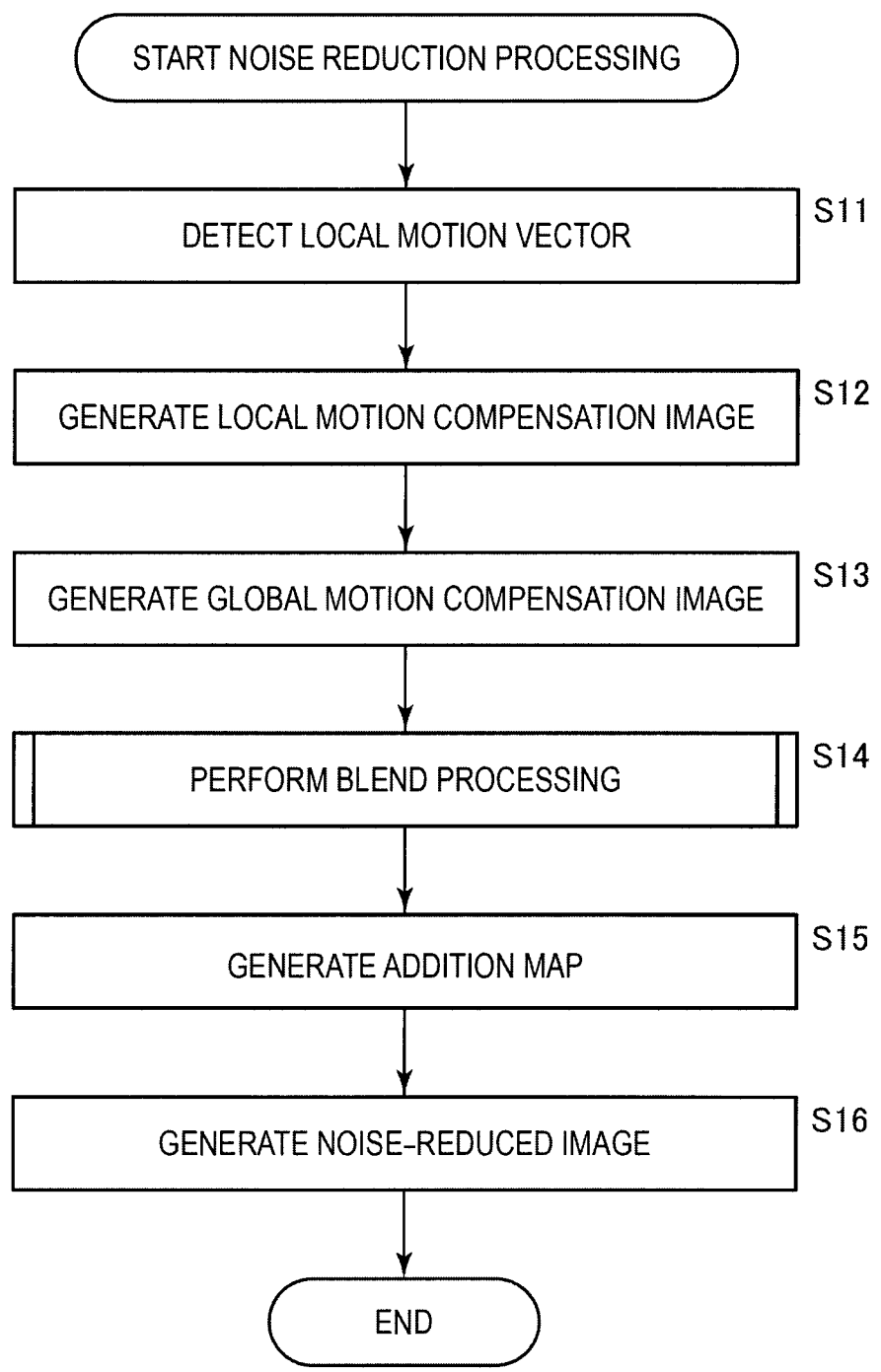
FIG. 3 is a flowchart illustrating noise-reduction processing.

Next, the noise reduction processing performed by the image processing apparatus 11 illustrated in FIG. 1 and the blend processing performed by the MC image blend processing unit 33 illustrated in FIG. 2 will be described with reference to the flowcharts of FIGS. 3 and 4.

[Regarding Noise Reduction Processing]

First, the noise reduction processing performed by the image processing apparatus 11 illustrated in FIG. 1 will be described with reference to the flowchart of FIG. 3.

In step S11, the local motion compensation processing unit 31 detects the local motion vector LMV for each block based on the Cur image and the NR image from the frame memory 36, and supplies the detected local motion vectors LMV to the global motion compensation processing unit 32.

In step S12, the local motion compensation processing unit 31 generates a local motion compensation image (LMC image) by performing NR image motion compensation using the local motion vectors LMV, and supplies the generated LMC image to the MC image blend processing unit 33.

In step S13, the global motion compensation processing unit 32 generates a global motion compensation image (GMC image) by performing NR image motion compensation using the local motion vectors LMV from the local motion compensation processing unit 31, and supplies the generated GMC image to the MC image blend processing unit 33.

In step S14, the MC image blend processing unit 33 generates a blend motion compensation image (BMC image) by executing blend processing to combine the LMC image from the local motion compensation processing unit 31 and the GMC image from the global motion compensation processing unit 32, and supplies the generated BMC image to the addition determination unit 34 and the addition processing unit 35. The blend processing will be described in more detail below.

In step S15, the addition determination unit 34 generates an addition map based on the Cur image and the BMC image from the MC image blend processing unit 33, and supplies the generated addition map to the addition processing unit 35.

In step S16, the addition processing unit 35 generates a noise-reduced image (NR image) by calculating for each pixel a weighted average between the Cur image and the BMC image based on the addition map from the addition determination unit 34, outputs the generated NR image to a (not illustrated) storage device, display device and the like, and holds (stores) the NR image in the frame memory 36.

In this manner, a noise-reduced image in which noise has been reduced is output.

[Regarding Blend Processing]

Next, the blend processing performed in step S14 in the flowchart of FIG. 3 will be described with reference to the flowchart of FIG. 4.

In step S31, the filter processing unit 51 performs filter processing on the Cur image, and supplies the processed Cur image to the difference calculation unit 53.

In step S32, the filter processing unit 52 performs filter processing on the GMC image, and supplies the processed GMC image to the difference calculation unit 53.

Thus, by performing filter processing on the Cur image and the GMC image, the noise included in the respective images can be suppressed. Further, the processing performed in steps S32 and S32 may be executed in parallel.

In step S33, the difference calculation unit 53 calculates for each pixel a difference value (difference absolute value) between the Cur image subjected to filter processing by the filter processing unit 51 and the GMC image subjected to filter processing by the filter processing unit 52, and supplies the calculated difference value to the threshold processing unit 54. The processing from step S33 onwards is executed in units of individual pixels.

In step S34, the threshold processing unit 54 determines whether the difference value for each pixel from the difference calculation unit 53 is greater than a predetermined threshold set based on the noise intensity for a luminance value.

Figure 5:
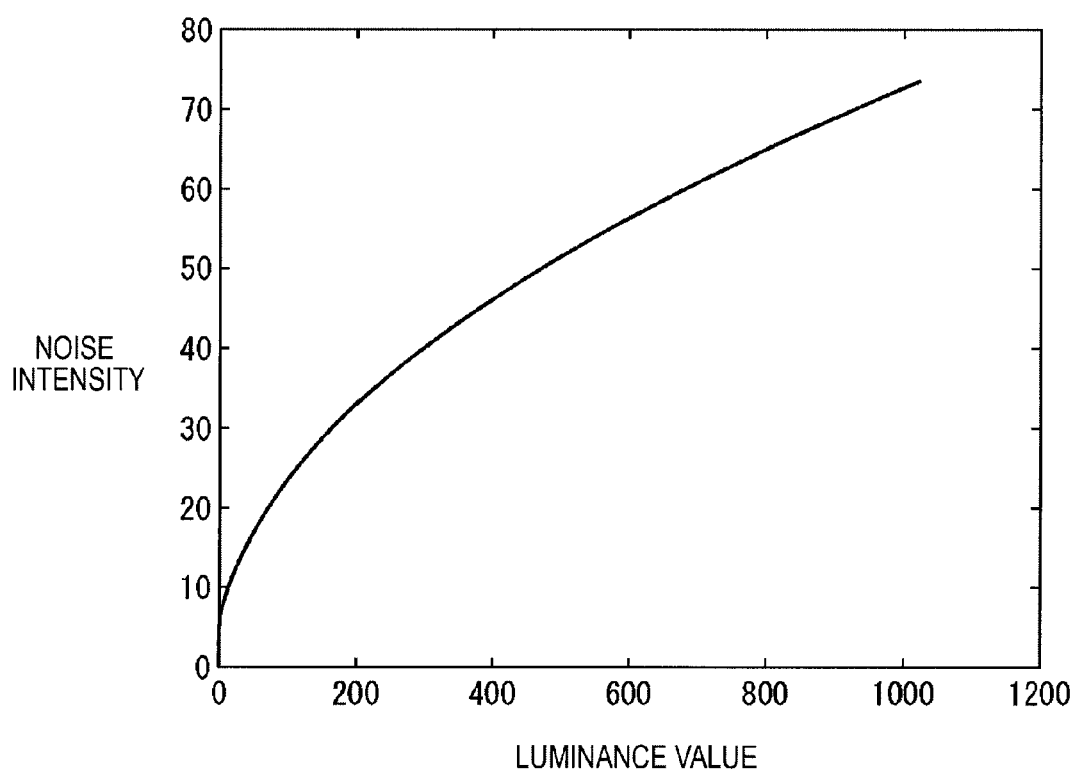
FIG. 5 is a graph illustrating noise intensity based on luminance value.

FIG. 5 is a graph illustrating noise intensity based on luminance value of an image obtained by a (not illustrated) imaging apparatus.

In FIG. 5, the horizontal axis represents pixel luminance value, and the vertical axis represents noise intensity. Since noise intensity is different depending on the pixel, the noise intensity illustrated in FIG. 5 is obtained based on a noise intensity distribution determined for each pixel in the whole image.

Noise intensity may be given for the luminance value (luminance signal) of three channels, R, G, and B. The noise intensity illustrated in FIG. 5 is, for example, the noise intensity for the G signal.

Specifically, based on a luminance value (e.g., the G signal) for a pixel in the Cur image at a pixel position that is of interest, the threshold processing unit 54 sets the noise intensity corresponding to that luminance value from the relationship illustrated in FIG. 5 as the threshold from the relationship illustrated in FIG. 5. Then, the threshold processing unit 54 compares that threshold with the difference value for each pixel from the difference calculation unit 53, and determines whether the difference value is greater than the threshold.

If the difference value is greater than the threshold, it can be said that the difference value (difference absolute value) between the Cur image pixel value and the GMC image pixel value not only includes noise, but also includes a difference in the image itself. Specifically, in this case, the pixel that is of interest is a pixel in a section in which there is localized motion.

On the other hand, if the difference value is not greater than the threshold, it can be said that the difference value (difference absolute value) between the Cur image pixel value and the GMC image pixel value only includes noise. Specifically, in this case, the pixel that is of interest is a pixel in a section in which there is not localized motion.

Therefore, if it is determined in step S34 that the difference value is greater than the threshold, namely, that the pixel is a pixel in a section in which there is localized motion, the processing proceeds to step S35. In step S35, the BMC image generation unit 55 sets the pixel value of the LMC image pixel to the pixel value of the corresponding BMC image pixel.

On the other hand, if it is determined in step S34 that the difference value is not greater than the threshold, namely, that the pixel is a pixel in a section in which there is not localized motion, the processing proceeds to step S36. In step S36, the BMC image generation unit 55 sets the pixel value of the GMC image pixel to the pixel value of the corresponding BMC image pixel.

In step S37, the BMC image generation unit 55 determines whether processing has been performed on all pixels, namely, determines whether the BMC image has been generated by selecting either the GMC image or the LMC image for each pixel.

If it is determined in step S37 that processing has not been performed on all pixels, the processing returns to step S33, and the processing from that step onwards is repeated.

On the other hand, if it is determined in step S37 that processing has been performed on all pixels, the BMC image generation unit 55 supplies the generated BMC image to the addition determination unit 34 and the addition processing unit 35, and finishes the blend processing. Then, the processing returns to step S14 in the flowchart of FIG. 3.

According to the above processing, a difference absolute value between the Cur image and the GMC image is calculated, and it is determined whether this difference absolute value is greater than a threshold set based on noise intensity. Then, a BMC image is generated by selecting for each pixel either the GMC image or the LMC image based on the determination result. Therefore, the LMC image and the GMC image can be correctly combined based on a noise intensity corresponding to the luminance value at that time, thus enabling a proper BMC image to be obtained, even when the illuminance in the imaging environment has changed. Consequently, a high quality noise-reduced image can be generated even under changing illuminance.

The threshold that is set based on the noise intensity may be, as described above, the value, per se, of the noise intensity corresponding to the luminance value, or may be a value adjusted by multiplying the noise intensity value by a predetermined coefficient, for example.

<4. Second Configuration Example of an MC Image Blend Processing Unit and Blend Processing>

[Second Configuration Example of an MC Image Blend Processing Unit]

Next, a second configuration example of an MC image blend processing unit will be described with reference to FIG. 6.

Figure 6:
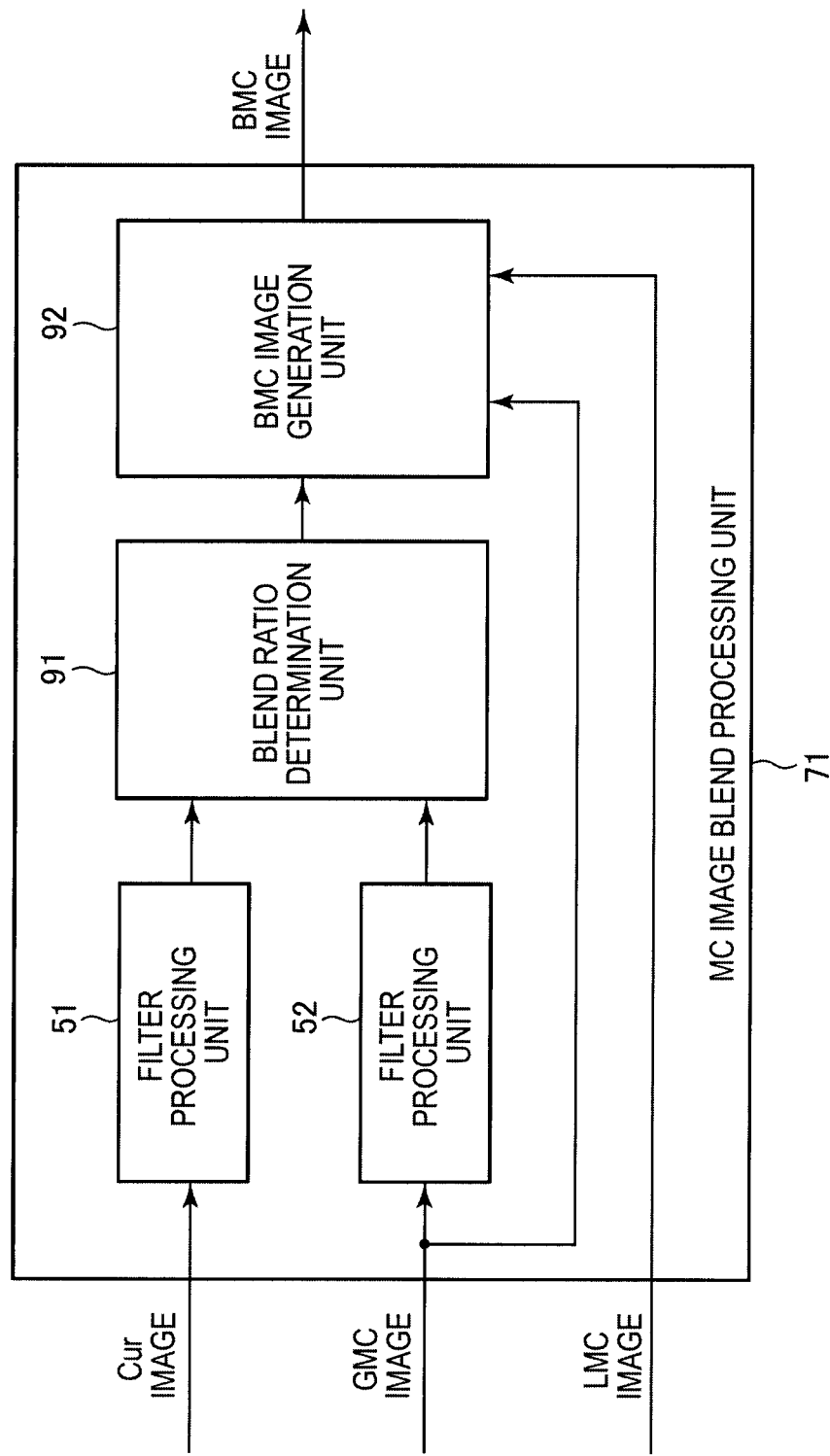
FIG. 6 is a block diagram illustrating a second configuration example of an MC image blend processing unit.

The MC image blend processing unit 71 illustrated in FIG. 6 is configured from a filter processing unit 51, a filter processing unit 52, a blend ratio determination unit 91, and a BMC image generation unit 92.

In the MC image blend processing unit 71 illustrated in FIG. 6, structures having the same function as the structures provided in the MC image blend processing unit 33 of FIG. 2 are denoted with the same name and the same reference numeral, and a description thereof will be omitted here.

The blend ratio determination unit 91 determines a blend ratio to be used for combining the GMC image and the LMC image by the BMC image generation unit 92, based on a Cur image from the filter processing unit 51, a GMC image from the filter processing unit 52, and the noise intensity based on luminance value, and supplies information representing that blend ratio to the BMC image generation unit 92.

The BMC image generation unit 92 generates a BMC image by combining (blending) the GMC image and the LMC image based on the information representing the blend ratio from the blend ratio determination unit 91.

[Regarding Blend Processing]

Here, the blend processing performed by the MC image blend processing unit 71 illustrated in FIG. 6 will be described with reference to the flowchart of FIG. 7.

Figure 4:
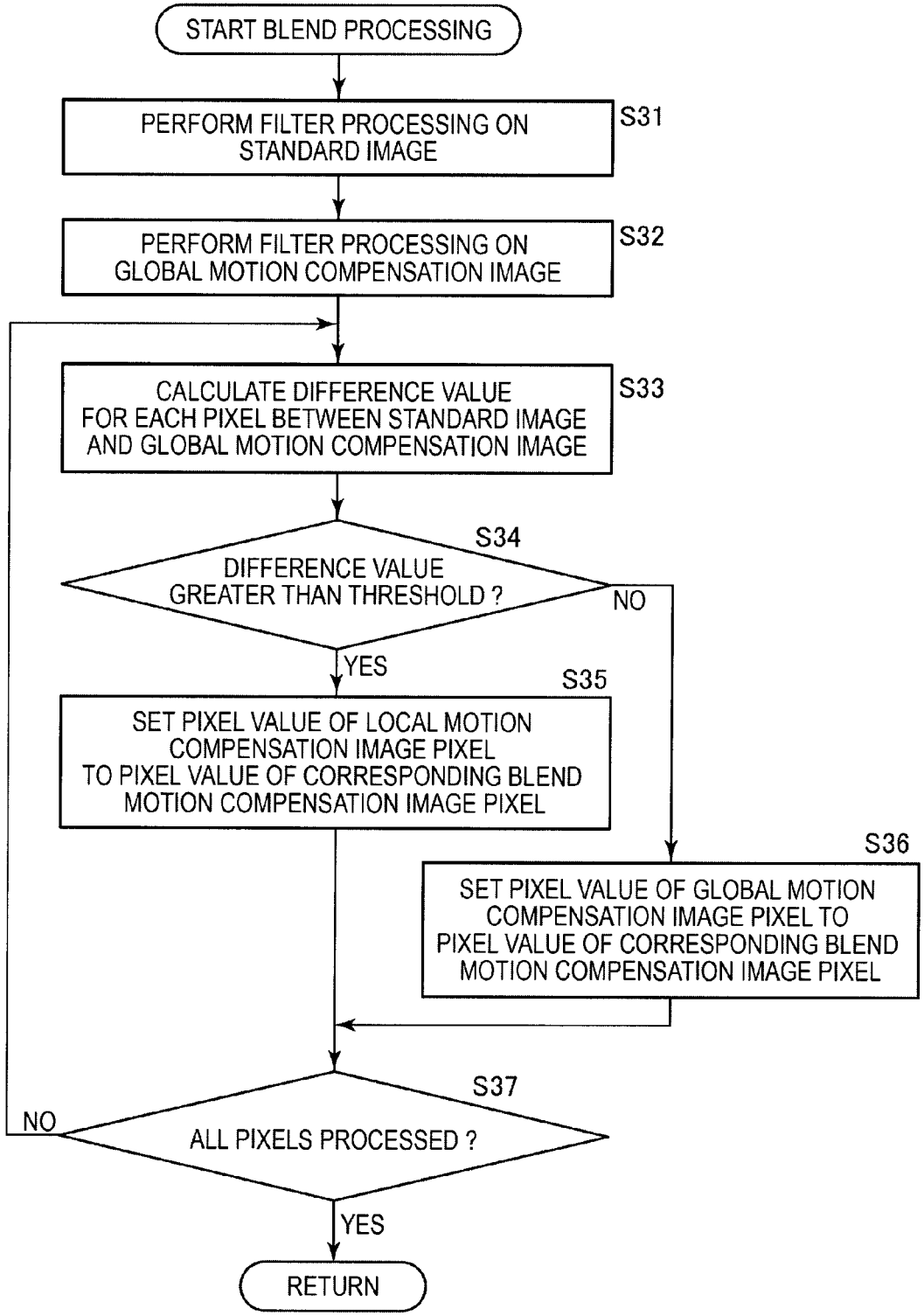
FIG. 4 is a flowchart illustrating blend processing performed by the MC image blend processing unit illustrated in FIG. 2.
Figure 7:
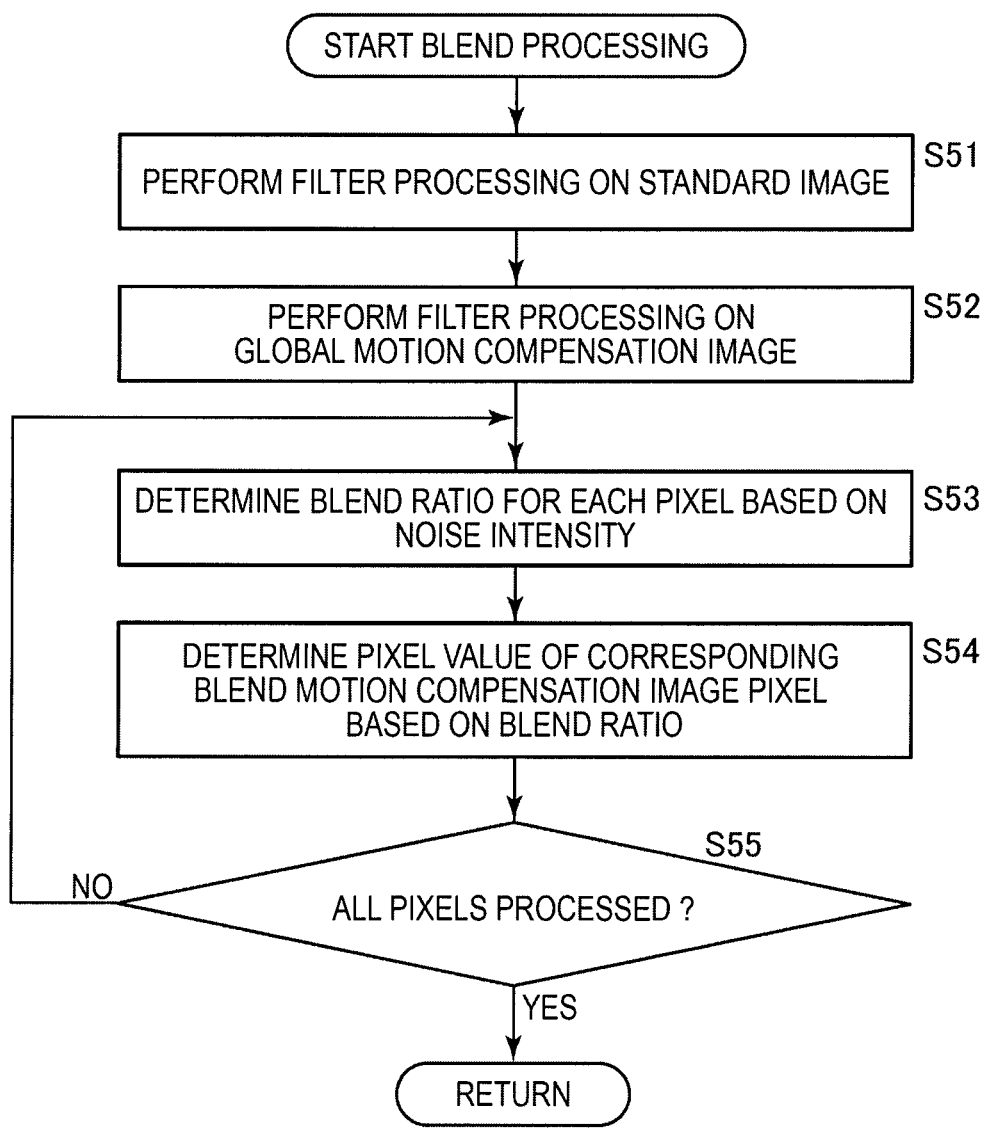
FIG. 7 is a flowchart illustrating blend processing performed by the MC image blend processing unit illustrated in FIG. 6.

Since the processing of steps S51 and S52 in the flowchart of FIG. 7 is the same as the processing of steps S31 and S32 in the flowchart of FIG. 4, respectively, a description thereof will be omitted here.

In step S53, the blend ratio determination unit 91 determines a blend ratio for the GMC image and the LMC image for each pixel based on the Cur image from the filter processing unit 51, the GMC image from the filter processing unit 52, and the noise intensity based on luminance value described with reference to FIG. 5, and supplies information representing that blend ratio to the BMC image generation unit 92.

Here, if the pixel values for the GMC image, LMC image, and BMC image pixels are Gmc, Lmc, and Bmc, respectively, and the ratio (blend ratio) of the pixel value Gmc of the GMC image with respect to the pixel value Bmc of the BMC image is $\alpha$ ($0 \leq \alpha \leq 1$), the pixel value Bmc of the BMC image obtained as a result of the blend processing is represented by the following Equation (1).

$$Bmc = \alpha \times Gmc + (1-\alpha) \times Lmc \quad (1)$$

Here, if the luminance value has only one channel, and the pixel value of the Cur image pixel is Cur, the blend ratio $\alpha$ can be represented by the following Equation (2).

$$\alpha = \exp\left(-\frac{(Cur - Gmc)^2}{2\sigma^2}\right)$$

In Equation (2), $\sigma$ represents the standard deviation of the above-described noise intensity distribution.

According to Equation (2), the blend ratio $\alpha$ is a value closer to 1 the smaller the difference is between the pixel value of the Cur image, which may contain a noise component, and the pixel value of the GMC image, and is a value closer to 0 the larger this difference is.

However, as described above, since the luminance value actually has three channels, R, G, and B, if the blend ratio for each of these is represented as $\alpha_R$, $\alpha_G$, and $\alpha_B$, the blend ratio $\alpha$ can be represented by the following Equation (3).

$$\alpha = \min(\alpha_R, \alpha_G, \alpha_B) \quad (3)$$

The min(a, b, c) represents the minimum value among a, b, and c.

The blend ratio $\alpha$ is determined in the above manner.

In step S54, the BMC image generation unit 92 determines the pixel value of the corresponding BMC image pixel based on the above Equation (1) based on the information representing the blend ratio from the blend ratio determination unit 91.

In step S55, the BMC image generation unit 92 determines whether processing has been performed on all pixels, namely, determines whether the BMC image has been generated by determining the pixel value of the pixels in the BMC image.

If it is determined in step S55 that processing has not been performed on all pixels, the processing returns to step S53, and the processing from that step onwards is repeated.

On the other hand, if it is determined in step S55 that processing has been performed on all pixels, the BMC image generation unit 92 supplies the generated BMC image to the addition determination unit 34 and the addition processing unit 35, and finishes the blend processing.

According to the above processing, based on a difference value between the Cur image and the GMC image and noise intensity, a blend ratio is determined, and a BMC image is generated by combining the GMC image and the LMC image based on this blend ratio. Therefore, the LMC image and the GMC image can be correctly combined based on a noise intensity corresponding to the luminance value at that time, thus enabling a proper BMC image to be obtained, even when the illuminance in the imaging environment has changed. Consequently, a high quality noise-reduced image can be generated even under changing illuminance.

Further, according to the above-described processing, since there is no switching for each pixel between the Cur image and the GMC image in the generated BMC image, deterioration of the gradation in the sections of the image having a tonal gradient can be prevented.

In the above, a configuration for generating a BMC image using the Cur image, the LMC image, and the GMC image was described. However, in the following a configuration for generating a BMC image using the LMC image and the GMC image, without using a Cur image, will be described.

<5. Third Configuration Example of an MC Image Blend Processing Unit and Blend Processing>

[Third Configuration Example of an MC Image Blend Processing Unit]

First, a third configuration example of an MC image blend processing unit will be described with reference to FIG. 8.

Figure 8:
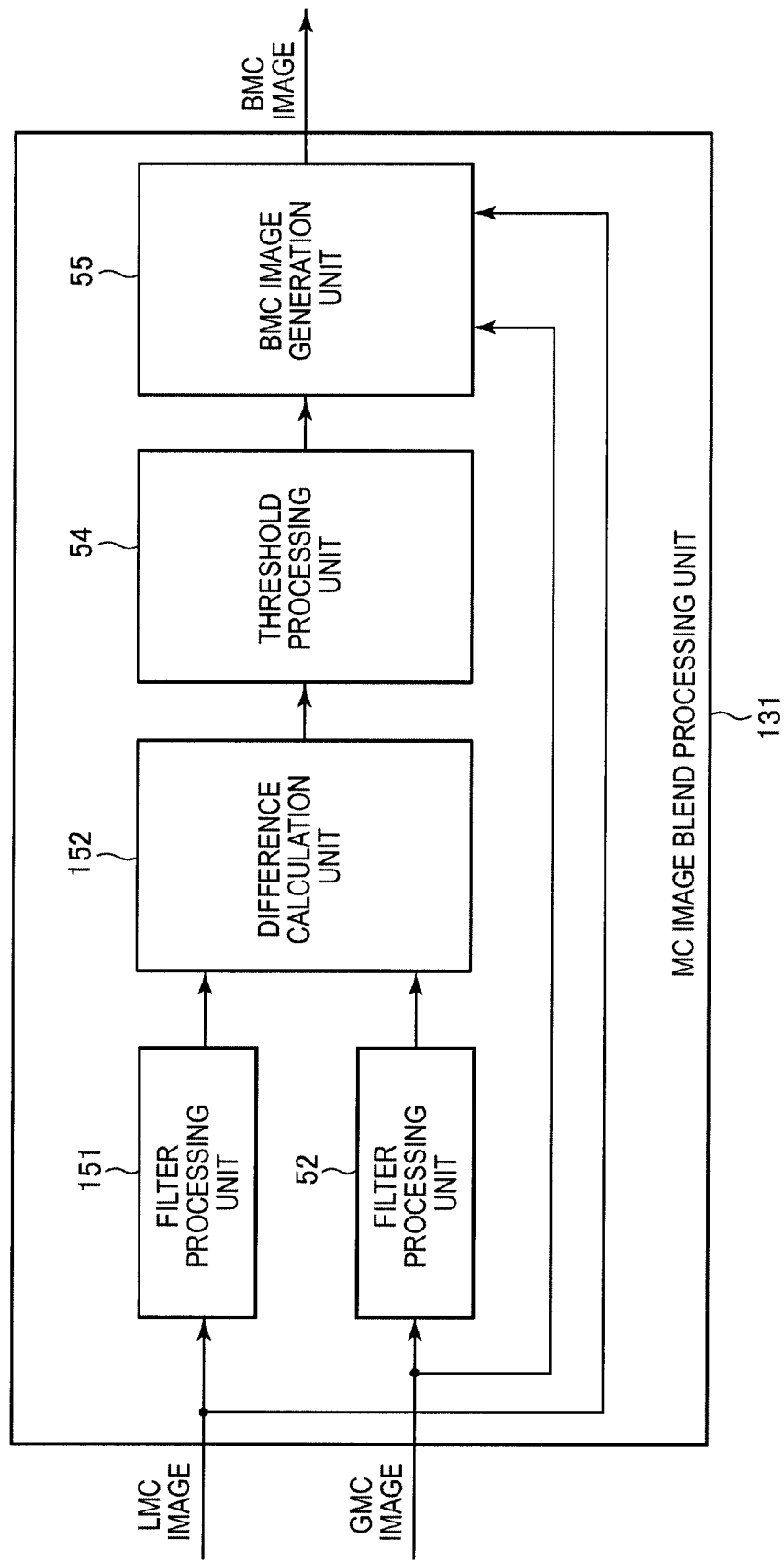
FIG. 8 is a block diagram illustrating a third configuration example of an MC image blend processing unit.

The MC image blend processing unit 131 illustrated in FIG. 8 is configured from a filter processing unit 52, a threshold processing unit 54, a filter processing unit 151, and a difference calculation unit 152.

In the MC image blend processing unit 131 illustrated in FIG. 8, structures having the same function as the structures provided in the MC image blend processing unit 33 of FIG. 2 are denoted with the same name and the same reference numeral, and a description thereof will be omitted here.

The filter processing unit 151 performs filter processing on the LMC image, and supplies the processed LMC image to the difference calculation unit 152. Specifically, the filter processing unit 151 performs filter processing on the LMC image using a filter such as a median filter, a low-pass filter, or a combination of a median filter and a low-pass filter.

The difference calculation unit 152 calculates for each pixel a difference in pixel value between the LMC image subjected to filter processing by the filter processing unit 151 and the GMC image subjected to filter processing by the filter processing unit 52, and supplies the absolute value (difference absolute value) of the calculated difference to the threshold processing unit 54.

[Regarding Blend Processing]

Next, the blend processing performed by the MC image blend processing unit 131 illustrated in FIG. 8 will be described with reference to the flowchart of FIG. 9.

Figure 9:
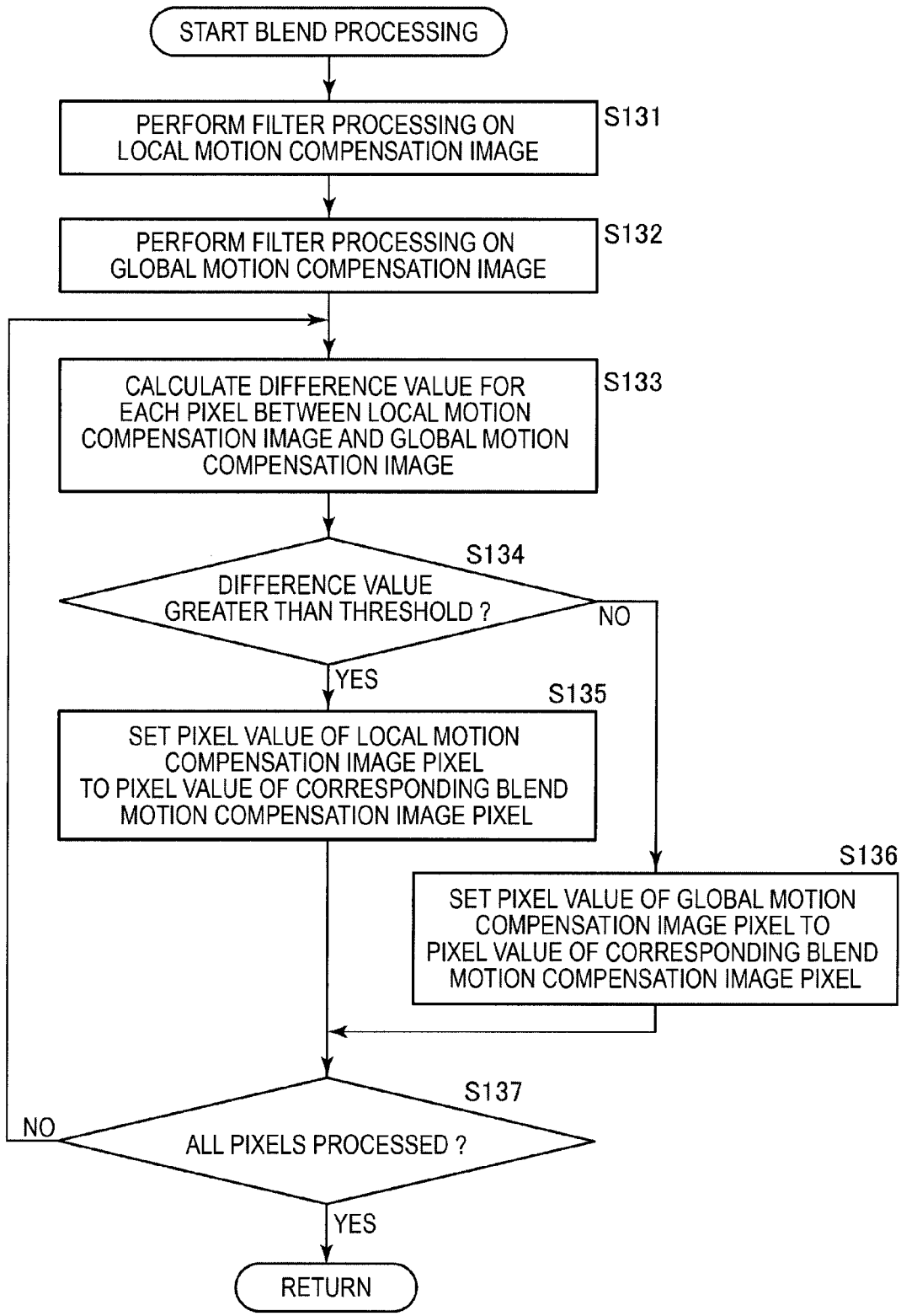
FIG. 9 is a flowchart illustrating blend processing performed by the MC image blend processing unit illustrated in FIG. 8.

Since the processing of steps S132 and S134 to S137 in the flowchart of FIG. 9 is the same as the processing of steps S32 and S34 to S37 in the flowchart of FIG. 4, respectively, a description thereof will be omitted here.

In step S131, the filter processing unit 151 performs filter processing on the LMC image, and supplies the processed LMC image to the difference calculation unit 152.

Further, in step S133, the difference calculation unit 152 calculates for each pixel a difference value (difference absolute value) between the LMC image subjected to filter processing by the filter processing unit 151 and the GMC image subjected to filter processing by the filter processing unit 52, and supplies the calculated difference value to the threshold processing unit 54.

Even with the blend processing illustrated in the flowchart of FIG. 9, the same advantageous effects as in the blend processing illustrated in the flowchart of FIG. 4 can be obtained. Further, since the number of pieces of data (images) used by the MC image blend processing unit 131 of FIG. 8 is less than the MC image blend processing unit 33 of FIG. 2, the circuit configuration can be simpler than that for the MC image blend processing unit 33.

<6. Fourth Configuration Example of an MC Image Blend Processing Unit and Blend Processing>

[Fourth Configuration Example of an MC Image Blend Processing Unit]

Next, a fourth configuration example of an MC image blend processing unit will be described with reference to FIG. 10.

Figure 10:
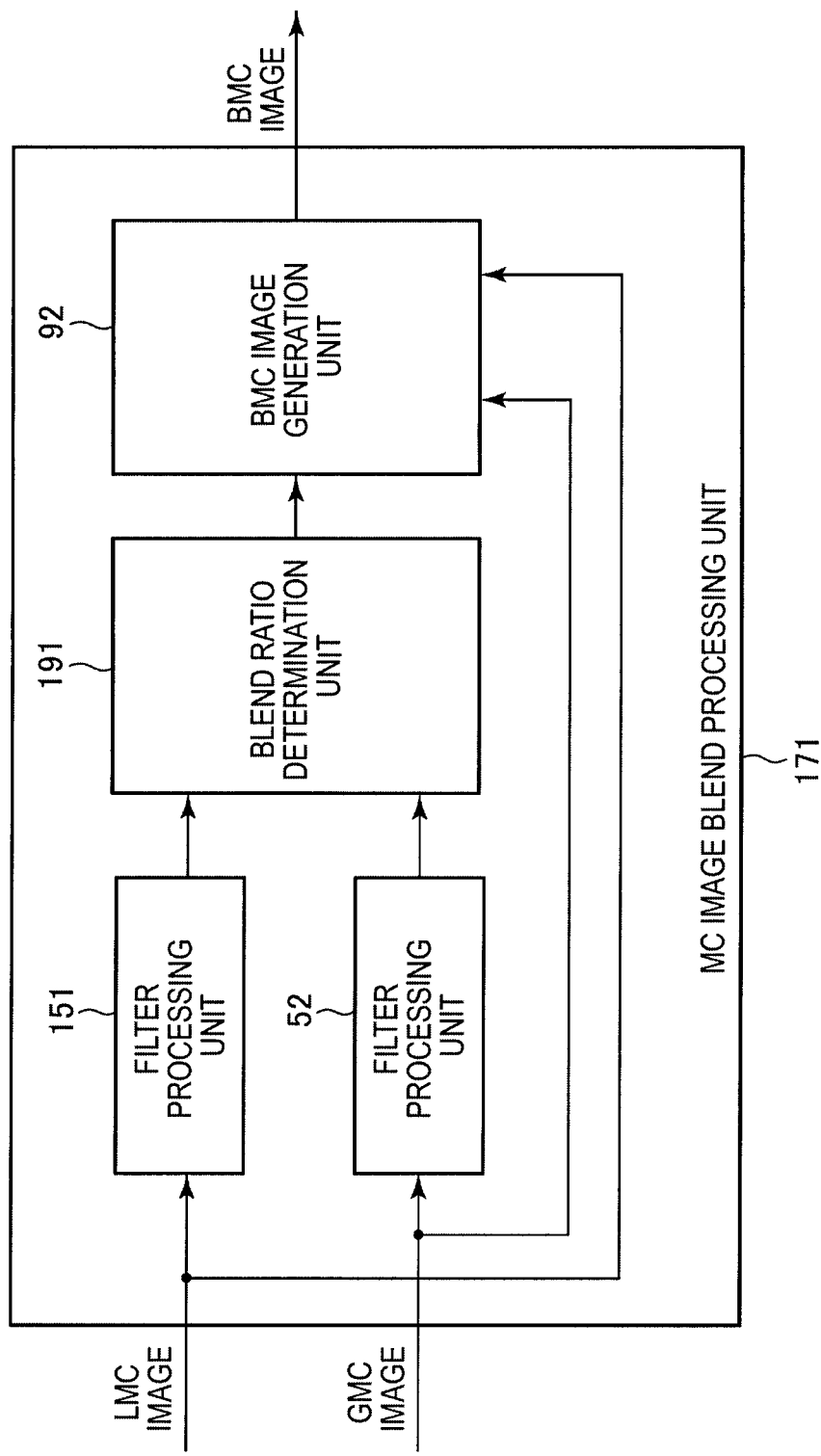
FIG. 10 is a block diagram illustrating a fourth configuration example of an MC image blend processing unit.

The MC image blend processing unit 171 illustrated in FIG. 10 is configured from a filter processing unit 52, a BMC image generation unit 92, a filter processing unit 151, and a blend ratio determination unit 191.

In the MC image blend processing unit 171 illustrated in FIG. 10, structures having the same function as the structures provided in the MC image blend processing unit 71 of FIG. 6 are denoted with the same name and the same reference numeral, and a description thereof will be omitted here. Further, since the filter processing unit 151 is the same as the filter processing unit 131 illustrated in FIG. 8, a description thereof will be omitted here.

The blend ratio determination unit 191 determines a blend ratio to be used for combining the GMC image and the LMC image by the BMC image generation unit 92, based on the LMC image from the filter processing unit 151, the GMC image from the filter processing unit 52, and the noise intensity based on luminance value, and supplies information representing that blend ratio to the BMC image generation unit 92.

[Regarding Blend Processing]

Next, the blend processing performed by the MC image blend processing unit 171 illustrated in FIG. 10 will be described with reference to the flowchart of FIG. 11.

Figure 11:
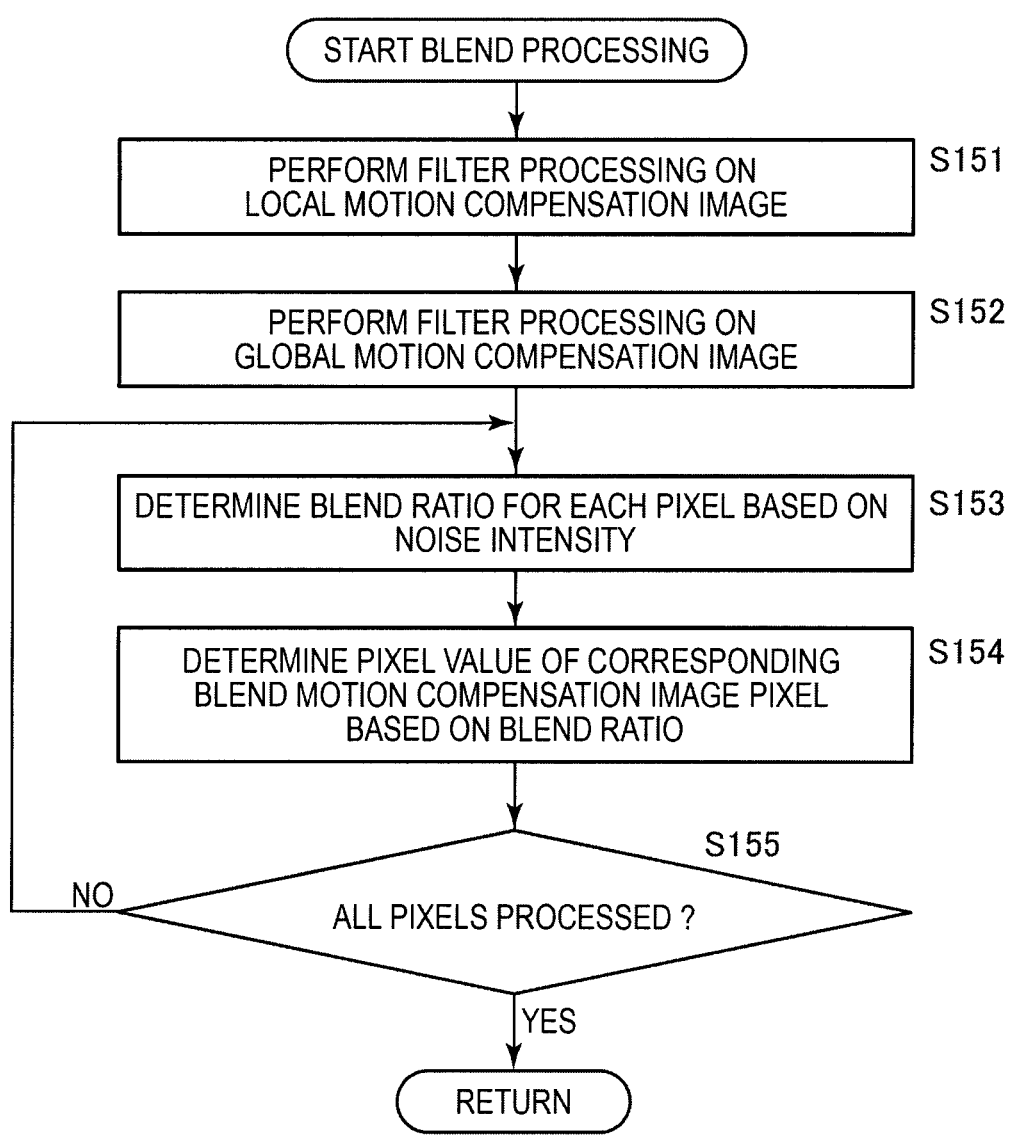
FIG. 11 is a flowchart illustrating blend processing performed by the MC image blend processing unit illustrated in FIG. 10.

Since the processing of steps S152, S154, and S155 in the flowchart of FIG. 11 is the same as the processing of steps S52, S54, and S55 in the flowchart of FIG. 7, respectively, a description thereof will be omitted here.

In step S151, the filter processing unit 151 performs filter processing on the LMC image, and supplies the processed LMC image to the blend ratio determination unit 191.

Further, in step S153, the blend ratio determination unit 191 determines a blend ratio of the GMC image and the LMC image for each pixel, based on the LMC image from the filter processing unit 151, the GMC image from the filter processing unit 52, and the noise intensity based on luminance value described with reference to FIG. 5, and supplies information representing that blend ratio to the BMC image generation unit 92. Moreover, the blend ratio α is determined based on the above-described Equation (2), in which the pixel value Cur of the Cur image is replaced with the pixel value Lmc of the LMC image.

Even with the blend processing illustrated in the flowchart of FIG. 11, the same advantageous effects as in the blend processing illustrated in the flowchart of FIG. 7 can be obtained. Further, since the number of pieces of data (images) used by the MC image blend processing unit 171 of FIG. 10 is less than for the MC image blend processing unit 71 of FIG. 6, the circuit configuration can be simpler than that for the MC image blend processing unit 71 of FIG. 6.

The above-described series of processes can also be executed by hardware or software. If this series of processes is to be executed by software, a program configuring the software may be installed in a computer that is incorporated in dedicated hardware, or may be installed in a general-purpose personal computer, for example, that is capable of executing various functions by installing various programs, from a program recording medium.

Figure 12:
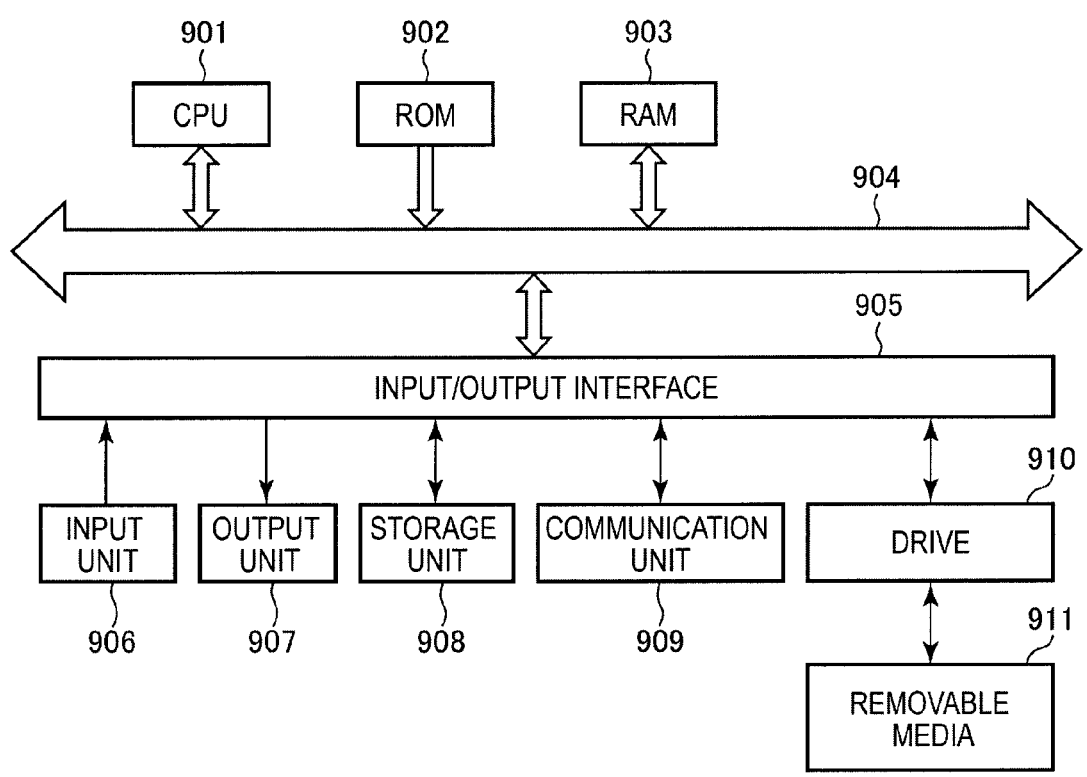
FIG. 12 is a block diagram illustrating a configuration example of computer hardware.

FIG. 12 is a block diagram illustrating a configuration example of the hardware in a computer that executes the above-described series of processes based on a program.

In the computer, a CPU (Central Processing Unit) 901, a ROM (Read Only Memory) 902, and a RAM (Random Access Memory) are connected to each other by a bus 904.

An input/output interface 905 is also connected to the bus 904. The input/output interface 905 is connected to an input unit 906 configured from a keyboard, a mouse, a microphone and the like, an output unit 907 configured from a display, a speaker and the like, a storage unit 908 formed from a hard disk, a non-volatile memory and the like, a communication unit 909 configured from a network interface and the like, and a drive 910 configured to drive a removable media 911, such as a magnetic disk, an optical disc, a magneto-optical disk, or a semiconductor memory.

In the thus-configured computer, the above-described series of processes is performed by, for example, the CPU 901 loading and executing a program stored in the storage unit 908 in the RAM 903 via the input/output interface 905 and the bus 904.

The program executed by the computer (the CPU 901) may be recorded on the removable media 911 (which is a package media) configured from, for example, a magnetic disk (including a flexible disk), an optical disc (CD-ROM (Compact Disc-Read Only Memory), DVD (Digital Versatile Disc) and the like), a magneto-optical disk, a semiconductor memory and the like. Alternatively, the program may be provided via a wired or wireless transmission medium, such as a local area network, the Internet, and a digital satellite broadcast.

The program may also be installed in the storage unit 908 via the input/output interface 905 by loading the removable media 911 in the drive 910. Further, the program can be received by the communication unit 909 via a wired or wireless transmission medium and installed in the storage unit 908. In addition, the program can also be installed in advance in the ROM 902 or the storage unit 908.

The program executed by the computer may be a program in which the processing is performed in chronological order in the sequence described in the present disclosure, or a program in which the processing is performed in parallel or at a required timing, such as when called.

It should be understood by those skilled in the art that various modifications, combinations, sub-combinations and alterations may occur depending on design requirements and other factors insofar as they are within the scope of the appended claims or the equivalents thereof.

For example, the present technique may have a cloud computing configuration, in which a single function is split up and shared among a plurality of apparatuses via a network.

Further, each step described in the above flowcharts may be executed by a single apparatus or be split up and executed by a plurality of apparatuses.

In addition, in the case of including a plurality of processes in a single step, the plurality of processes included in that one step can be executed by a single apparatus or be split up and executed by a plurality of apparatuses.

The present disclosure contains subject matter related to that disclosed in Japanese Priority Patent Application JP 2011-213867 filed in the Japan Patent Office on Sep. 29, 2011, the entire content of which is hereby incorporated by reference.

What is claimed is:

1. An image processing apparatus, comprising:
a local motion compensation processing unit configured to generate a local motion compensation image by detecting a local motion vector, which is a motion vector for each block forming an image, from a standard image and a reference image, and performing motion compensation on the reference image using the local motion vector;
a global motion compensation processing unit configured to generate a global motion compensation image by calculating a global motion vector, which is a motion vector for an entire image between the standard image and the reference image, using the local motion vector, and performing motion compensation on the reference image using the global motion vector; and
a blend processing unit configured to generate a blend motion compensation image by combining a pixel value of a pixel in the local motion compensation image and a pixel value of a pixel in the global motion compensation image based on a noise intensity for a luminance value of an image.

2. The image processing apparatus according to claim 1, wherein the blend processing unit comprises:
a threshold processing unit configured to determine whether a difference absolute value between a pixel value of a pixel in the standard image and a pixel value of a pixel in the local motion compensation image is greater than a threshold set based on the noise intensity; and
a blend motion compensation image generation unit configured to generate the blend motion compensation image by setting a pixel value of a pixel in the blend motion compensation image to a pixel value of a pixel in the local motion compensation image or the global motion compensation image based on whether the difference absolute value is greater than the threshold or not.

3. The image processing apparatus according to claim 2, wherein the blend motion compensation image generation unit is configured to, when it is determined that the difference absolute value is greater than the threshold, set the pixel value of a pixel in the blend motion compensation image to the pixel value of a pixel in the local motion compensation image, and when it is determined that the difference absolute value is not greater than the threshold, set the pixel value of a pixel in the blend motion compensation image to the pixel value of a pixel in the global motion compensation image.

4. The image processing apparatus according to claim 1, wherein the blend processing unit comprises:
a blend ratio determination unit configured to determine a blend ratio to be used in combining a pixel value of a pixel in the local motion compensation image and a pixel value of a pixel in the global motion compensation image based on the noise intensity; and
a blend motion compensation image generation unit configured to generate the blend motion compensation image by combining a pixel value of a pixel in the local motion compensation image and a pixel value of a pixel in the global motion compensation image based on the blend ratio.

5. An image processing method performed by an image processing apparatus, the image processing apparatus including
a local motion compensation processing unit configured to generate local motion compensation image by detecting a local motion vector, which is a motion vector for each block forming an image, from a standard image and a reference image, and performing motion compensation on the reference image using the local motion vector,
a global motion compensation processing unit configured to generate a global motion compensation image by calculating a global motion vector, which is a motion vector for an entire image between the standard image and the reference image, using the local motion vector, and performing motion compensation on the reference image using the global motion vector, and
a blend processing unit configured to generate a blend motion compensation image by combining a pixel value of a pixel in the local motion compensation image and a pixel value of a pixel in the global motion compensation image based on a noise intensity for a luminance value of an image,
the image processing method comprising:
generating a local motion compensation image by detecting a local motion vector, which is a motion vector for each block forming an image, from a standard image and a reference image, and performing motion compensation on the reference image using the local motion vector;
generating a global motion compensation image by calculating a global motion vector, which is a motion vector for an entire image between the standard image and the reference image, using the local motion vector, and performing motion compensation on the reference image using the global motion vector; and
generating a blend motion compensation image by combining a pixel value of a pixel in the local motion compensation image and a pixel value of a pixel in the global motion compensation image based on a noise intensity for a luminance value of an image.

6. An image processing apparatus comprising:
a processor; and
a memo communicatively coupled to the processor, the memo being encoded with instructions which, when executed on the processor, cause the processor to execute:
local motion compensation processing for generating a local motion compensation image by detecting a local motion vector, which is a motion vector for each block forming an image, from a standard image and a reference image, and performing motion compensation on the reference image using the local motion vector;
global motion compensation processing for generating a global motion compensation image by calculating a global motion vector, which is a motion vector for an entire image between the standard image and the reference image, using the local motion vector, and performing motion compensation on the reference image using the global motion vector; and
blend processing for generating a blend motion compensation image by combining a pixel value of a pixel in the local motion compensation image and a pixel value of a pixel in the global motion compensation image based on a noise intensity for a luminance value of an image.

7. A non-transitory computer-readable storage medium encoded with instructions which, when executed on a processor, perform a method, the method comprising:
generating a local motion compensation image by detecting a local motion vector, which is a motion vector for each block forming an image, from a standard image and a reference image, and performing motion compensation on the reference image using the local motion vector;

generating a global motion compensation image by calculating a global motion vector, which is a motion vector for an entire image between the standard image and the reference image, using the local motion vector, and performing motion compensation on the reference image using the global motion vector; and generating a blend motion compensation image by combining a pixel value of a pixel in the local motion compensation image and a pixel value of a pixel in the global motion compensation image based on a noise intensity for a luminance value of an image.

8. The image processing apparatus according to claim 1, further comprising:
an addition determination unit configured to generate a noise reduced image by adding a weighted average between the local motion compensation image and the blend motion compensation image to one or more pixels in the blend motion compensation image.

9. The image processing apparatus according to claim 1, wherein the blend motion compensation image is generated based on a blend ratio.

10. The image processing apparatus according to claim 9, wherein the blend processing unit is further configured to calculate the blend ratio based on the local motion compensation image, the global motion compensation image, and the noise intensity.

11. The image processing method according to claim 5, further comprising:
determining whether a difference absolute value between a pixel value of a pixel in the standard image and a pixel value of a pixel in the local motion compensation image is greater than a threshold set based on the noise intensity; and
generating the blend motion compensation image by setting a pixel value of a pixel in the blend motion compensation image to a pixel value of a pixel in the local motion compensation image or the global motion compensation image based on whether the difference absolute value is greater than the threshold or not.

12. The image processing method according to claim 11, further comprising:
when it is determined that the difference absolute value is greater than the threshold, setting the pixel value of a pixel in the blend motion compensation image to the pixel value of a pixel in the local motion compensation image, and
when it is determined that the difference absolute value is not greater than the threshold, setting the pixel value of a pixel in the blend motion compensation image to the pixel value of a pixel in the global motion compensation image.

13. The image processing method according to claim 5, further comprising:
determining a blend ratio to be used in the combining of a pixel value of a pixel in the local motion compensation image and a pixel value of a pixel in the global motion compensation image based on the noise intensity; and
generating the blend motion compensation image based on the blend ratio.

14. The image processing apparatus according to claim 6, the instructions further causing the processor to execute:
threshold processing for determining whether a difference absolute value between a pixel value of a pixel in the standard image and a pixel value of a pixel in the local motion compensation image is greater than a threshold set based on the noise intensity; and blend motion compensation image generation processing for generating the blend motion compensation image by setting a pixel value of a pixel in the blend motion compensation image to a pixel value of a pixel in the local motion compensation image or the global motion compensation image based on whether the difference absolute value is greater than the threshold or not.

15. The image processing apparatus according to claim 14, wherein the blend motion compensation image generation processing includes, when it is determined that the difference absolute value is greater than the threshold, setting the pixel value of a pixel in the blend motion compensation image to the pixel value of a pixel in the local motion compensation image, and when it is determined that the difference absolute value is not greater than the threshold, setting the pixel value of a pixel in the blend motion compensation image to the pixel value of a pixel in the global motion compensation image.

16. The image processing apparatus according to claim 6, the instructions further causing the processor to execute:
blend ratio determination processing for determining a blend ratio to be used in combining a pixel value of a pixel in the local motion compensation image and a pixel value of a pixel in the global motion compensation image based on the noise intensity; and
blend motion compensation image generating processing for generating the blend motion compensation image based on the blend ratio.

17. The computer-readable storage medium according to claim 7, the method further comprising:
determining whether a difference absolute value between a pixel value of a pixel in the standard image and a pixel value of a pixel in the local motion compensation image is greater than a threshold set based on the noise intensity; and
generating the blend motion compensation image by setting a pixel value of a pixel in the blend motion compensation image to a pixel value of a pixel in the local motion compensation image or the global motion compensation image based on whether the difference absolute value is greater than the threshold or not.

18. The computer-readable storage medium according to claim 17, the method further comprising:
when it is determined that the difference absolute value is greater than the threshold, setting the pixel value of a pixel in the blend motion compensation image to the pixel value of a pixel in the local motion compensation image, and
when it is determined that the difference absolute value is not greater than the threshold, setting the pixel value of a pixel in the blend motion compensation image to the pixel value of a pixel in the global motion compensation image.

19. The computer-readable storage medium according to claim 7, the method further comprising:
determining a blend ratio to be used in the combining of a pixel value of a pixel in the local motion compensation image and a pixel value of a pixel in the global motion compensation image based on the noise intensity; and
generating the blend motion compensation image based on the blend ratio.

20. The computer-readable storage medium according to claim 7, the method further comprising:
generating a noise reduced image by adding a weighted average between the local motion compensation image and the blend motion compensation image to one or more pixels in the blend motion compensation image.

* * * * *